Aug. 13, 1968  CARL-GORAN HEDEN  3,396,947
VIBRATION DEVICE
Filed Sept. 15, 1967

United States Patent Office 3,396,947
Patented Aug. 13, 1968

3,396,947
VIBRATION DEVICE
Carl-Goran Heden, Solna, Sweden, assignor to Biotec Aktiebolag, Stockholm, Sweden, a joint-stock company of Sweden
Filed Sept. 15, 1967, Ser. No. 667,897
Claims priority, application Sweden, Sept. 19, 1966, 12,594/66
3 Claims. (Cl. 259—72)

ABSTRACT OF THE DISCLOSURE

A shaking machine having a circular translatoric shaking movement and comprising a base, a vertical rotatable shaft journalled in the base and provided with an accentric at its upper end, and a horizontal shaking table adapted to carry the material or the objects to be shaken movably supported from the base member and coupled to the shaft through the eccentric. The supporting means for the shaking table comprise a horizontal rigid rectangular frame, which is linearly movably supported from the base member through runner means, as for instance wheels, guided by and movable along two opposite and parallel sides of the frame. The shaking table is in a similar manner linearly movably supported from the frame through other runner means, as for instance wheels, guided by and movable along the two remaining opposite and parallel sides of the frame.

Background of the invention

The invention relates to a shaking machine having a circular translatoric shaking movement. Shaking machines or apparatuses of this type have various applications, as for instance for jolting of casting moulds, vibrating of moulded concrete products, sieving or screening of various materials, vibrating of reaction vessels in chemical processes, agitating of chemical or biological samples in laboratories, etc.

A shaking machine of this type may preferably consist of a base member having a vertical rotatable shaft journalled therein and provided with an eccentric at its upper end, and a horizontal screening, sieving or shaking table, on which the material or the objects to be shaken are placed and which is coupled to the shaft through the eccentric and movably supported, preferably from the base member, in a manner permitting the circular translatoric movement in a horizontal plane applied to the table from the shaft through the eccentric. One problem in a shaking machine of this type is the supporting of the shaking table. The supporting means must obviously be adapted to permit the circular translatoric movement of the shaking table and preferably such a movement with variable amplitude and simultaneously to carry the weight of the shaking table and the material or objects to be shaken. At the same time, however, the supporting means must also guide and control the movement of the shaking table so as to assure that the movement will take place in a predetermined plane, generally a horizontal plane, and that the movement of the shaking table is not affected by a possible unsymmetric loading of the shaking table. Furthermore, the supporting means should of course be as simple and inexpensive as possible and require little space. It is also desired that the supporting means permit the shaking table to be easily and rapidly dismounted and replaced by another shaking table.

Summary of the invention

A shaking machine according to the present invention will meet all the above discussed needs in a very satisfactory manner. The shaking machine according to the invention is characterized by a horizontal rigid rectangular frame disposed between the base member and the shaking table and linearly movably supported from the base through runner means guided by and movable along one pair of opposite sides of said frame, the shaking table resting linearly displaceable on the frame through a number of runner means guided by and movable along the other pair of opposite sides of the frame.

The supporting means for the shaking table in a shaking machine according to the invention are obviously very simple and compact, as they comprise only the rigid rectangular frame and two sets of runner means movable along the sides of the frame, the one set of runner means disposed between the frame and the base and the other set of runner means disposed between the frame and the shaking table. The frame may preferably consist quite simply of rods or tubes with a circular cross section forming the sides of the frame and rigidly connected to each other in a suitable way at the corners of the frame. Thus, in the most simple case the frame can consist of a single rod with a circular cross section bent to form a rectangular frame. The runner means can in this case consist of wheels mounted on the base member and the shaking table respectively and running along the sides of the frame. These wheels have a concave or grooved circumferential running surface, whereby a mutual lateral guiding is achieved between the frame and the wheels. Also other types of runner means can of course be used. In a particularly advantageous embodiment the runner means consist of so-called ball bearing bushings, which are mounted on the base and the shaking table respectively and enclose and are movable along the sides of the frame. In a similar manner it is also possible to use conventional slide bearing bushings instead of ball bearing bushings.

Brief description of the drawing

In the following the invention will be further described with reference to the accompanying drawing, which shows by way of example some preferred embodiments of the invention. In the drawings.

Description of the preferred embodiments

Figure 2:
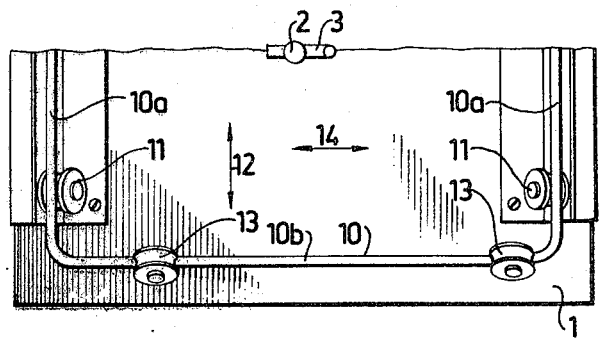
FIG. 2 is a plan view of a portion of the shaking machine of FIG. 1 with the shaking table removed.
Figure 1:
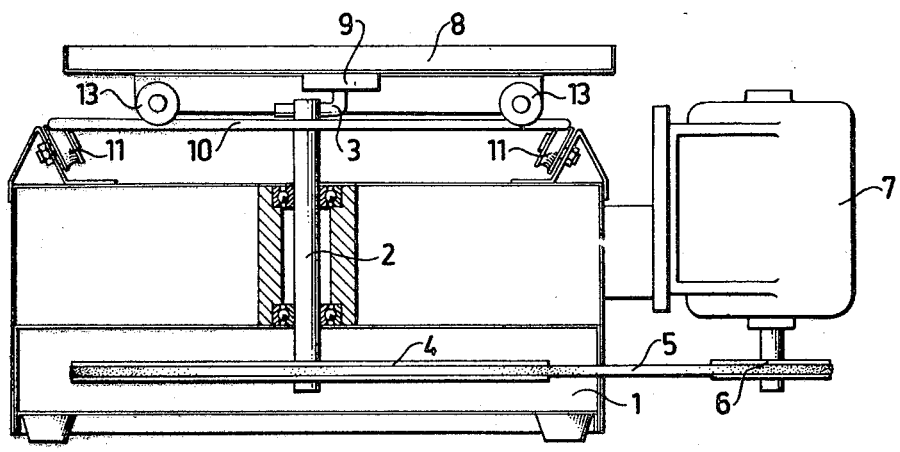
FIG. 1 is a schematic vertical section through a shaking machine according to the invention.

The shaking machine according to the invention shown in FIGS. 1 and 2 comprises a box-shaped base 1, in which a vertical rotatable shaft 2 is journalled. The upper end of the shaft is projecting from the base and carries an eccentric arm 3. The lower end of the shaft 2 is provided with a belt pulley 4 coupled by a driving belt to a belt pulley 6 attached to the shaft of an electric drive motor 7 mounted on the outer side of the base 1. The shaking machine comprises also a horizontal shaking table 8, which can be designed in any suitable way dependent on the purpose for which the shaking machine is to be used. On its lower side the shaking table 8 has a suitable bearing 9, for the eccentric tap of the eccentric arm 3. As the shaft 2 is rotated by the drive motor 7, the shaking table 8 will consequently perform a circular translatoric motion in a horizontal plane, the amplitude of the motion being determined by the effective length of the eccentric arm 3. The effective length of the eccentric arm may be adjusted by displacement of the eccentric arm in its attachment to the shaft 2.

The supporting means for the shaking table 8 comprise according to the invention a rigid, horizontal, rectangular frame 10 disposed between the shaking table 8 and the base 1. In the embodiment of the invention shown in the drawings this frame 10 consists of a rod or a tube with circular cross section bent to a rectangular frame. With two opposite sides 10a the frame rests on a number of runner wheels 11 mounted on the upper side of the base 1. Only two of these wheels are shown in the drawing. Consequently, the wheels 11 can run along the two opposite sides 10a of the frame and these sides will serve as tracks for the wheels 11. A mutual lateral guiding between the frame sides 10a and the wheels 11 is obtained in that the wheels have a semi-circular groove in their circumferential surface corresponding to the cross section of the frame. Consequently, the frame is linearly movable relative to the base in the direction indicated by an arrow 12. The shaking table 8 rests upon the frame 10 with a number of runner wheels 13 mounted on the lower side of the shaking table. Only two of these runner wheels are shown in the drawing. The wheels 13 are similar to the wheels 11 but arranged to run along the two other opposite sides 10b of the frame 10. Consequently, the shaking table 8 is linearly displaceable relative to the frame 10 in the direction indicated by an arrow 14. Thus, the shaking table can without restriction perform the circular translatoric movement in a horizontal plane applied to it by the shaft 2 through the eccentric arm 3.

By supporting the shaking table 8 from the base 1 as described above, the weight of the shaking table and the material or objects being shaken is transferred to the base 1 at the same time as it is assured that the movement of the shaking table will always be in a horizontal plane and free from any undesired influences from a possible unsymmetric loading of the shaking table with the material or objects to be shaken. It is also obvious that the supporting of the shaking table according to the invention permits the amplitude of the translatoric movement of the shaking table to be changed.

Several modifications of the shaking machine according to the invention are of course possible. Thus, for instance, the runner wheels 11 and 13 could of course instead of being mounted on the base 1 and the shaking table 8 respectively be mounted on the frame to run along suitable tracks on the base 1 and the shaking table 8 respectively. This would, however, make the frame 10 considerably more complicated without any substantial advantages being gained. Instead of wheels of the type shown in FIGS. 1 and 2 it is of course also possible to use other runner means cooperating with the frame 10 or a frame of somewhat different design. With a frame 10 consisting of rods or tubes with a circular cross section, as shown in FIGS. 1 and 2, a particularly preferable embodiment of the invention uses so-called ball bearing bushings instead of the runner wheels shown in FIGS. 1 and 2.

Figure 3:
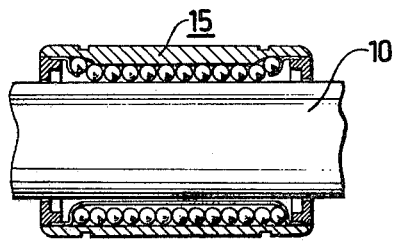
FIG. 3 is a schematic axial section through a ball bearing bushing, which can be used as runner means in a shaking machine as shown in FIGS. 1 and 2.

FIG. 3 shows schematically and in axial section a type of a ball bearing bushing 15. The ball bearing bushing 15 comprises a number of endless ball races extending in the axial direction of the bushing with a plurality of balls running in each race. Within each race the balls are along the one longer side of the race in supporting contact with the inner side of the bushing and the shaft, on which the bushing is mounted. In the present case this shaft consists of one side of the frame 10. The remaining portion of each ball race serves as a return path for the balls, in which the balls run unloaded. Ball bearing bushings 15 of this type can be attached to the base 1 and the lower side of the shaking table 8 respectively in the same way as the runner wheels 11 and 13 so that the bushings enclose the sides 10a and 10b repectively of the frame 10 and are movable along them. When ball bearing bushings of this type are used instead of runner wheels, the frame 10 will obviously be guided very accurately relative to the base 10 and similarly the shaking table 8 will be guided very accurately relative to the frame 10. Furthermore, the total required height of the supporting means between the upper side of the base 1 and the lower side of the shaking table 8 is very small, as all ball bearing bushings 15 will be disposed in one and the same plane and moreover in the plane of the frame 10.

What is claimed is:

1. A shaking machine having a circular translatoric shaking movement and comprising a base member (1), a vertical rotatable shaft (2) journalled in the base member and provided with an eccentric (3) at its upper end, and a horizontal shaking table (8) coupled to the shaft through the eccentric and movably supported from the base member through supporting means, wherein the novel and characteristic features are that said supporting means comprise a horizontal rigid rectangular frame (10) disposed between the base member and the shaking table, the frame being linearly movably supported from the base member through first runner means (11) guided by and movable along one pair (10a) of opposite sides of the frame and the shaking table resting linearly movable on the frame through second runner means (13) guided by and movable along the other pair (10b) of opposite sides of the frame.

2. A shaking machine according to claim 1, wherein said first and second runner means consist of wheels (11 and 13 respectively) attached to the base member (1) and the shaking table (8) respectively and running along the sides of the frame (10), the sides of the frame forming tracks for said wheels.

3. A shaking machine according to claim 1, wherein said first and second runner means consists of ball bearing bushings (15) mounted on and movable along the sides of the frame (10) and attached to the base member (1) and the shaking table (8) respectively.

References Cited

UNITED STATES PATENTS

| | | | |
|---|---|---|---|
| 2,976,792 | 3/1961 | Chambers | 259—72 X |
| 3,241,250 | 3/1966 | Broadwin | 259—72 X |
| 3,360,253 | 12/1967 | Mori | 259—91 |

ROBERT W. JENKINS, *Primary Examiner.*